Oct. 21, 1952　　　A. L. MATHISEN　　　2,614,857
VEHICLE
Filed Oct. 17, 1950
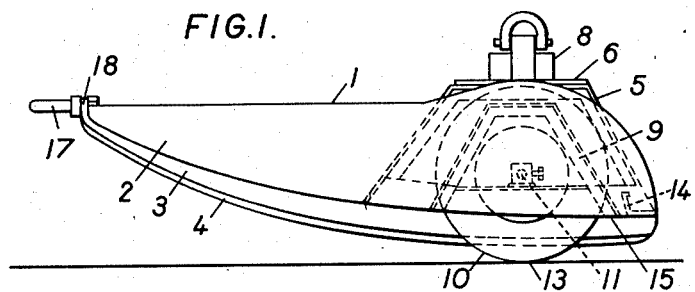
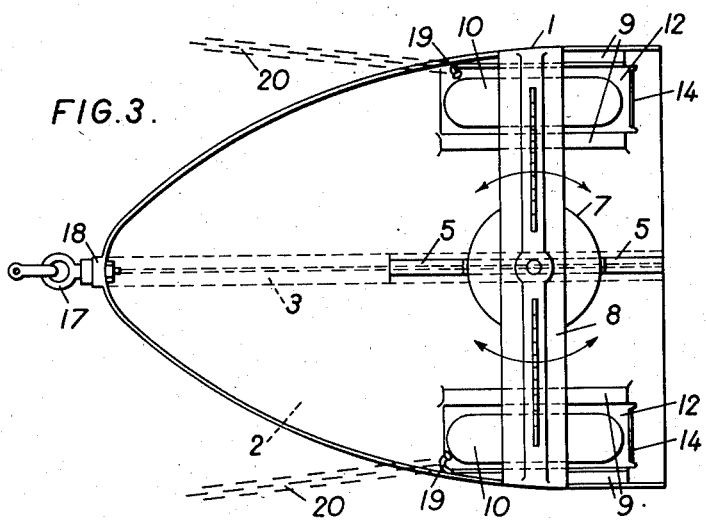
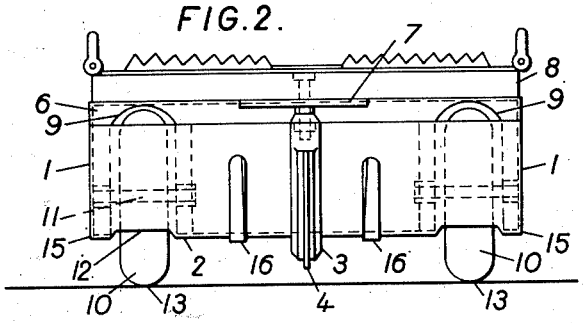
INVENTOR
Arne L. Mathisen
By Watson, Cole, Grindle & Watson Patented Oct. 21, 1952

2,614,857

UNITED STATES PATENT OFFICE 2,614,857

VEHICLE

Arne Lars Mathisen, Sandvika, Norway

Application October 17, 1950, Serial No. 190,554
In Norway October 18, 1949

4 Claims. (Cl. 280—8)

The present invention relates to vehicles and the object of the invention is a vehicle which is adapted to be used with equal efficiency for the purposes of dragging and carrying articles of any type, such as logs which may be dragged with one end secured to and carried by the vehicle or carried at either end by two identical vehicles, or the vehicle may in itself be loaded with any article or articles in conventional manner. Hereby the running of the vehicle is to be independent of the state of the ground and to a large extent independent of the condition of the roadway to be passed.

According to the invention, this is achieved by making the vehicle out of sheet material and in a shape similar to the foremost portion of a boat, provided with a fore-and-aft sleigh runner. Being so shaped the vehicle will, when drawn forwards automatically be held upright and return to such position if, due to some irregularity in the ground the same is tilted to one side. Similarly, the vehicles will turn aside or be lifted when abutting against stumps, stones or the like, whereby sticking of the vehicle is avoided.

In order also to be adapted for use on roadways, independently of the state of the road along the route to be passed, the vehicle suitably is provided with means for detachably mounting the running wheels. When so equipped, the vehicle may be run continuously on rough ground, along wood tracks and roadways under conditions varying from sleighing to wheeling without thereby necessitating any reloading of the load.

In order to obtain an improved control when running in loose snow or in springtime when sleighing may be failing, the sleigh runner along the fore-and-aft line of the vehicle suitably may be provided with a downwardly projected control rail, for instance in the form of a T-iron extending along the runner, and similarly tilting or rolling rails may be arranged along the side edges and, if desired, between the wheels.

The vehicle according to the invention suitably is provided with connecting means in the foremost part adapted to be connected to a draw member, such as a horse shaft or a tractor draw bar, but is also in addition thereto suitably provided with connecting means for draw lines of the like adjacent to the front of the running wheels, whereby a more steady-going running is obtained. Further, it may be suitable to provide the front connecting means with a swivel, so as to enable the vehicle to be tilted for the purpose of loading or unloading and also in all circumstances to be independent of the position occupied by the shaft or draw means.

In the accompanying drawings, an embodiment of the vehicle according to the invention is schematically illustrated.

Figure 1 is a side view of the vehicle, Figure 2 is a front view of the same and Figure 3 is a plan view of the same.

As shown in the drawing, the vehicle proper is made of side and bottom plates 1 and 2 respectively, the plates being so bent and welded together that they form a shell-like body similar to the foremost portion of a boat, the bottom plate being provided with a sleigh runner 3 having a control rail 4 in the form of a T-iron extending along the said runner 3. Between the side plates 1, above the runner 3 a framelike construction 5 is mounted on the bottom plate 2, which frame, together with the side plates 1 carries a horizontal stiffening plate 6 and also supports a swing disc 7 supporting the swing bridge 8. Further, four frames 9 are arranged in pairs on the bottom plate 2 towards each side plate 1, which frames serve as bearing stands for the running wheels 10. The said wheels are mounted on detachable shafts 11 so that the wheels may be removed or replaced simply by pulling the associated shaft 11 towards the interior of the vehicle body. The wheels 10 extend downwardly through apertures 12 in the bottom plate 2 and are so dimensioned and arranged that the lowermost point 13 of each wheel is situated at a lower level than the lower edge of the rail 4 between the wheels, so that the rail 4 will only engage the ground when the wheels penetrate into the ground, but is inactive when the vehicle is running on a hard roadway.

The apertures 12 in the bottom sheet 2 through which the wheels 10 project are so dimensioned that the front and back edges of the same are reinforced by the frames 9 and in addition thereto an upturned tongue 14 is formed at the back edge of each aperture preventing the vehicle from sticking on roots, stones or the like which may engage the back edge of an aperture.

Further stiffening of the vehicle body may be obtained by the provision of rails 15 and 16 extending in the direction of length of the vehicle, of which the former serve as tilting edges when the vehicle is laid over on one side by loading and unloading, while the latter serve as sleigh runners by running over roots, stones or the like.

A connecting member 17 for a draw means such as a shaft is provided at the foremost part of the vehicle and this member is preferably provided with a swivel 18 so that the angular position of the vehicle is independent of that of the draw means. In addition hereto securing means 19 is arranged adjacent to the foremost part of each wheel for the securing of further draw means, such as draw lines 20, if such are desired for the purpose of obtaining a more steady-going running.

In operation the vehicle may be used with or without wheels 10 according to the state and nature of the ground, and with or without swing bridge 8 or the swing bridge may be secured in middle position, according to the use of the vehicle for the dragging of logs or in pair as front and rear bogie of a combined vehicle. When the vehicle is used for dragging, the loading may, due to the boat shape be effected by turning the vehicle over on one side and securing the log or logs to the stationary swing bridge, whereupon the vehicle will automatically erect itself with the log or logs in position when the vehicle is run forward. Due to the shape and the swivel between the draw shaft and the vehicle, the vehicle may also be turned completely over, one or even more times as the case may be, without subjecting the draw shaft and thereby the horse or tractor to any torsional stress. By running over rough ground and while dragging logs, the draw lines 20 are suitably omitted whereby the vehicle will wriggle along the ground in an easy and supple manner without undue stress on the shaft and horse or tractor.

I claim:

1. A land vehicle comprising a body made of sheet material and having bottom and side portions so formed and inter-connected as to provide a structure similar to the bow portion of a boat, a longitudinal sleigh runner secured to the underside of the bottom portion and extending centrally throughout the length of the body, and means for detachably mounting a wheel shaft at the inner side of each of the said side portions, an aperture being provided in the said bottom portion adjacent to each of the said side portions permitting a wheel mounted on the said wheel shaft to protrude downwardly through the said aperture to such an extent that the lowermost point of such wheel is below the bottom of the said sleigh runner.

2. A land vehicle as claimed in claim 1, the said sleigh runner being provided with a downwardly projecting rib extending along the length thereof.

3. A land vehicle as claimed in claim 1, including reinforcements at either side of the apertures in the bottom portion of the vehicle body and extending along the length of the said apertures.

4. A land vehicle as claimed in claim 1, including rail-like members arranged along the interconnection lines between the said bottom portion and each of the said side portions.

ARNE LARS MATHISEN.

REFERENCES CITED

The following references are of record in the file of this patent:

UNITED STATES PATENTS

| Number | Name | Date |
|---|---|---|
| 1,566,610 | Leblanc | Dec. 22, 1925 |
| 2,370,508 | Wilkie | Feb. 27, 1945 |
| 2,515,564 | Mercer et al. | July 18, 1950 |
| 2,538,599 | Swanson | Jan. 16, 1951 |

FOREIGN PATENTS

| Number | Country | Date |
|---|---|---|
| 528,181 | France | Aug. 11, 1951 |